3,565,826
Patented Feb. 23, 1971

3,565,826
CATALYST FOR THE CATALYTIC GAS PHASE-OXIDATION OF PROPYLENE OR ACROLEIN INTO ACRYLIC ACID

Kurt Sennewald and Alfred Hauser, Knapsack, near Cologne, and Winfried Lork, Friesheim, near Euskirchen, Germany, assignors to Knapsack Aktiengesellschaft, Knapsack, near Cologne, Germany, a corporation of Germany
No Drawing. Filed June 25, 1968, Ser. No. 739,658
Claims priority, application Germany, July 5, 1967, K 62,727
Int. Cl. B01j *11/82*
U.S. Cl. 252—437         3 Claims

ABSTRACT OF THE DISCLOSURE

Catalyst consisting of the oxides of iron, bismuth, molybdenum and optionally phosphorus for use in the catalytic gas-phase-oxidation of propylene or acrolein by means of oxygen into acrylic acid, the catalyst containing silver oxide as an additional component in the atomic ratio of $Ag_{0.01-1.5}Fe_{0.1-12}Bi_{0.1-12}P_{0-5}Mo_{12}O_{30-110}$.

---

The present invention relates to a catalyst which is based on the oxides of iron, bismuth, molybdenum and optionally phosphorus for use in the catalytic gas phase-oxidation of propylene or acrolein by means of oxygen into acrylic acid.

It has already been described in German published specification 1,241,817 to produce acrylic acid by the gas phase-oxidation of propylene in contact with oxidic bismuth-molybdenum-iron catalysts with or without phosphorus oxide. British Pats. 822,140 and 903,034 disclose the production of acrylic acid by the gas phase-oxidation of acrolein in contact with similar bismuth molybdate-catalysts.

In the production of acrylic acid by such processes, the catalyst activity is found to undergo a rather rapid decrease which can be evened out only partially by a temperature increase. This activity loss of bismuth molybdate-catalysts which has already been found to occur in the production of acrolein by propylene oxidation (cf. German Pat. 1,196,631, German published specification 1,236,480 and Belgian Pat. 663,817) can be obviated either by means of an excess of oxygen, which must be present in the effluent reaction gas, by vaporization on the catalyst of volatile catalyst constituents, for example molybdenum oxide, or by treatment of the powdery catalyst with aqueous ammonia. Exhaustive catalyst treatment with an air-stream mixture at temperatures higher than 300° C. combined, if desired, with a reducing propylene treatment are the steps which alone ensure the complete regeneration of the inactive catalyst, in the production of acrylic acid by propylene oxidation. However, these are very costly possibilities of catalyst regeneration and result in high production losses, which are entailed by repeated stops of the production facilities.

It has now unexpectedly been found that the active lifetime of conventional iron-bismuth-phosphorus-molybdate-catalysts can be considerably prolonged by the addition of small proportions of silver or silver oxide. In accordance with the present invention, acrylic acid is produced by the gas phase-oxidation of propylene or acrolein in contact with the oxidation catalyst such as that defined by the following general formula:

Whereas in the above formula, the $b$ and $c$ indexes may vary within the wide range between 0.1 and 12 and the $d$ index may vary between 0 and 5, given that index $e=12$, the oxygen index $f$ is a function of the catalyst's oxidation stage and varies between 30 and 110, the silver index $a$ has unexpectedly been found to be within the narrow range between 0.01 and 1.5.

Molybdate catalysts activated by means of silver compounds for use in the production of acrylic acid from propylene have already been described in German Pat. 1,204,659. However, these catalysts with their considerable proportions of incorporated phosphoric acid produce an acrylic acid yield which is as low as 22% for a 38% propylene conversion rate. Needless to say, therefore, they are unsuitable for commercial use.

The above patent teaches using the silver in concentrations which are very high, referred to the further catalyst metal concentrations. On using these silver concentrations in the present Ag-Fe-Bi-P-Mo-oxide catalysts, these will be found to be completely inactive for the oxidation of propylene into acrylic acid. Catalysts containing too low a silver concentrations offer no advantages over silver-free catalysts, whereas catalysts containing too high a proportion of silver may be found to be completely inactive. As can be inferred from this, the range between 0.3 and 4, preferably between 0.5 and 2% by weight Ag—this is referred to the catalyst's total metal content and corresponds to $a$ indexes between 0.01 and 1.5—represents the silver concentration optimum range.

The catalyst which may be deposited on a carrier, such as SiC, $Al_2O_3$ or $SiO_2$, can be produced by mixing a nitric or phosphoric acid solution of silver, bismuth and iron nitrates with powdered molybdenum oxide or ammonium molybdate or with a solution of molybdenum oxide in phosphoric acid and, after evaporation to dryness at 100° C., calcining the catalytically active mass at 350 to 500° C. until the evolution of nitrous gases is found to have died down. The catalyst so produced is comminuted to obtain particles with a size between 4 and 8 mm. which can be used at once or—to improve the dissipation of heat—in loose admixture with an inert solid, such as SiC-particles, in a solid bed reactor. Pulverulent particles can be compressed into pellets or balls, after admixture of a compression auxiliary, such as graphite. Preferably, however, the catalyst is formed in the catalyst bed itself, the catalyst being then pretreated for a period of 2 to 5 hours, at a temperature between 400 and 500° C. with a gas mixture comprising 80% by volume air and 20% by volume steam. This can be combined with a further pretreatment step using a dilute propylene-nitrogen-steam mixture (cf. Ind. Enging. Chem., vol. 49, p. 244 (1957)).

The reaction of propylene or acrolein with oxygen to produce acrylic acid is preferably carried out by the process described in German published specification 1,241,817, wherein a gas mixture composed of:

3–10% by volume propylene and/or
3–10% by volume acrolein
3–10% by volume oxygen
60–83% by volume carbon monoxide and dioxide, and
5–25% by volume steam is conveyed during a period of time between 0.1 and 5 seconds, at temperatures between 280 and 600° C., preferably between 350 and 520° C., and at pressures between 0.5 and 5 atmospheres absolute, preferably at atmospheric pressure, over the present silver-iron-bismuth molybdate catalyst or silver-iron-bismuth-phosphorus molybdate catalyst, and acrylic acid is isolated from the resulting reaction gas mixture either by partial condensation (cf. DAS 1,241,817) or by extraction (cf. Belgian Pat. 702,492 or 707,929).

The present catalysts are more particularly distinguished by their constant high activity and selectivity for the oxidation of propylene or acrolein into acrylic acid. For a productivity of up to 185 grams acrylic acid per liter of catalyst per hour and acrylic acid yields of up to 67%, referred to the propylene conversion rate of substantially 95%, the present catalysts ensure highly economic conditions for the whole process. The catalysts simultaneously enable high acrylic acid concentrations of up to 1.9% by volume to be obtained in the reaction gas mixture for rather low steam concentrations of only 5 to 20% by volume. This means a considerable reduction of the specific quantity of cycle gas needed to produce a given quantity of acrylic acid, and means lower production costs. The acrylic acid solutions obtained by the process carried out with the present catalysts are very concentrated and are therefore accessible to easy finishing treatment into desirable acrylic acid derivatives.

The present invention relates more particularly to a catalyst, which is based on the oxides of iron, bismuth, molybdenum and optionally phosphorus for use in the catalytic gas phase-oxidation of propylene or acrolein by means of oxygen into acrylic acid, the said catalyst containing silver oxide as an additional component in the atomic ratio of $$Ag_{0.01-1.5}Fe_{0.1-12}Bi_{0.1-12}P_{0-5}Mo_{12}O_{30-110}$$

The catalyst can be deposited on a carrier, such as silicon carbide, aluminum oxide or silicic acid ($SiO_2$). It is preferably used in the form of particles having a size between about 4 and 8 mm. and can be used in loose admixture with silicon carbide particles having the same size. The present catalyst can also be used in pellet or ball form, the pellets or balls being obtained by compression of the catalytically active mass, after admixture of a compression auxiliary, such as graphite.

EXAMPLE 1

(a) Catalyst preparation.—A catalyst with the composition $$Ag_{0.12}Fe_{1.1}Bi_{0.3}Mo_{12}P_{0.1}O_{38.41}$$

and containing about 1% by weight Ag, referred to the catalyst's total metal content, was prepared in the manner set forth below.

8880 grams $MoO_3$-powder were introduced with agitation into a solution having a temperature of about 50 to 70° C. and produced from 2292 grams ($Fe(NO_3)_3\cdot 9H_2O$, 740 grams $Bi(NO_3)_3\cdot 5H_2O$ and 103.2 grams $AgNO_3$) in 2300 cc. water, the water having been acidified with 500 cc. concentrated nitric acid. To the resulting suspension there were added a further 74 grams 85% phosphoric acid. After evaporation to dryness, the catalytically active mass was sintered first for about 10 hours at 350–370° C. and later for a further 10 hours at 460–470° C. The resulting catalyst was crushed and screened to obtain particles with a size between 4 and 6 mm. 350 cc. of the catalyst particles were loosely mixed with 350 cc. silicon carbide particles of identical particle size, the mixture was placed in a U-shaped reactor, and heated therein to a constant temperature of 450° C. by means of a salt bath, the reactor having an inside diameter of 30 mm. The catalyst was formed by 4-hour passing over it of 1.3 normal cubic meters (N.T.P.) of a gas mixture comprising 20% by volume steam and 80% by volume air. The oxygen was expelled by means of nitrogen, 5% by volume propylene were added to the gas mixture, and the catalyst was subjected to reducing treatment at 450° C., for 40 minutes.

(b) Comparative catalyst.—A comparative catalyst composed of $$Fe_{1.1}Bi_{0.3}Mo_{12}P_{0.1}O_{38.35}$$

but free from silver was prepared and formed in the manner described under (a), save that no silver nitrate was added.

(c) Comparative experiment.—350 cc. of each of the two catalysts mixed with 350 cc. silicon carbide particles were used. 1.44 normal cubic meters cycle gas were passed per hour over the catalysts at the temperatures listed in the following table, the cycle gas being fed per hour with a maximum of 37.8 grams=0.9 mol propylene, oxygen and steam so as to produce a fairly constant cycle gas composition of:

6.7% by volume propylene
4.2% by volume oxygen
7.5% by volume acrolein
11.0% by volume steam
42.3% by volume $CO_2$
27.6% by volume CO and
0.7% by volume balance gas ($H_2$, $C_2H_4$ and similar gases).

TABLE

| | Catalyst 1a | | | | Catalyst 1b | | |
|---|---|---|---|---|---|---|---|
| Reaction time in hours | Temp., °C. | Catalyst productivity, acrylic acid in grams per liter per hour | Acrylic acid yield in percent, referred to propylene conversion rate | Reaction time in hours | Temp., °C. | Catalyst productivity, acrylic acid in grams per liter per hour | Acrylic acid yield in percent, referred to propylene conversion rate |
| 36 | 420 | 111 | 67.4 | 36 | 430 | 113 | 62.4 |
| 94 | 420 | 104 | 63.2 | 84 | 445 | 109 | 66.0 |
| 131 | 430 | 108 | 66.2 | 108 | 450 | 96 | 62.5 |
| 177 | 430 | 111 | 64.9 | 150 | 450 | 50 | 62.0 |

The total propylene conversion rate was 94 to 95%. By partial condensation at 6° C. in the column-cooling system and after evaporation of dissolved acrolein from the column base, there was obtained per hour a maximum of 40 grams (0.55 mol) acrylic acid, which was a 20% aqueous solution containing a further 1% acetic acid and formaldehyde.

The catalyst productivities were compared. Despite the 20° C. temperature increase, catalyst (1b) was found after as short an operation period as 100 hours to have undergone a 15% loss in activity, which strongly increased further, for smaller average acrylic acid yields.

EXAMPLE 2

A catalyst composed of $$Ag_{0.06}Fe_{1.1}Bi_{0.3}Mo_{12}P_{0.1}O_{38.38}$$

and having a particle size between 0.4 and 0.7 mm. was produced in the manner described in Example (1a) above.

350 cc. of the above catalyst were mixed with 350 cc. SiC=particles, the mixture was placed in a U-shaped reactor 30 mm. wide and heated to a temperature of 430° C. Propylene (40.7 grams/hr.=0.97 mol/hr.), steam and oxygen were added to the cycle gas (1.44 normal cubic meters/hr.) so as to produce a fairly constant cycle gas composition of:

6.2% by volume propylene
4.5% by volume oxygen
6.9% by volume acrolein
11.3% by volume steam
39.0% by volume $CO_2$
31.3% by volume CO and
0.8% by volume balance gas ($H_2$, $C_2H_4$ and similar gases)

The sojourn time was about 0.9 second. The reaction gas, which contained about 1% by volume acrylic acid, was subjected to the finishing treatment described in Example (1c) above. Acrylic acid, which was in the form of a 22.5% aqueous solution, was obtained at the rate of 44.6 grams per hour. The acrylic acid yield was 63.8%, referred to the propylene added, or 66.6%, referred to the propylene transformed. The catalyst was found to have a productivity of 127 grams acrylic acid per liter per hour. In addition, there was obtained a 2.5% yield of acetic acid plus a 4% yield of formaldehyde. The experiment was conducted over a total period of 135 hours.

EXAMPLE 3

1290 cc. of a catalyst having the composition $$Ag_{0.12}Fe_{1.1}Bi_{0.3}Mo_{12}P_{0.1}O_{38.41}$$

were produced in the manner described in Example (1a) above. Prior to forming the catalyst, the above 1290 cc. were mixed with 5% powdered graphite and the mixture was compressed into pellets 4 mm. wide and 2 mm. high. The pelletized catalyst was placed in a U-shaped reactor 32.5 mm. wide and maintained therein at a temperature of 404–406° C., by means of a salt bath. 2.45 normal cubic meters cycle gas, which was fed per hour with 139 grams (=3.31 mols) propylene, were passed per hour over the catalyst. Oxygen was added so as to produce the following average cycle gas composition:

6.0% by volume propylene
7.6% by volume oxygen
7.4% by volume acrolein
20.0% by volume steam
31.4% by volume $CO_2$
26.9% by volume CO and
0.7% by volume balance gas ($H_2$, $C_2H_4$ and similar gases)

The resulting reaction gas containing 1.85% by volume acrylic acid in vapor form left the reactor after a sojourn time of 0.85 second. It was cooled down to about 140° C. by means of a heat exchanger, and was conveyed then to an extraction column which was operated at 63° C. In that column, the acrylic acid was washed out in countercurrent fashion by the introduction of 200 cc. water near the column head. The steam-saturated cycle gas was returned to the reactor, whereas the issuing gas was withdrawn through a pressure-retaining valve. The acrylic acid solution coming from the extraction column was freed from low-boiling constituents (acrolein and similar compounds) in a stripping column and was withdrawn at a rate of 448 grams per hour. The acrylic acid content was 32.8%. This was found to correspond to an acrylic acid yield of 61.6%, referred to the propylene added, or 63.6%, referred to the propylene transformed. The catalyst productivity was 114 grams acrylic acid per liter per hour. In addition, there was obtained a 2.5% yield of acetic acid plus a 3.5% yield of formaldehyde. The yields and catalytic productivities were found to remain practically constant over a measured period of 225 hours.

EXAMPLE 4

650 cc. of a phosphorus-free catalyst composed of $$Ag_{0.12}Fe_{1.1}Bi_{0.3}Mo_{12}O_{38.16}$$

were produced in the manner described in Example (1a) above, however, without phosphoric acid, and mixed with 650 cc. SiC-particles. The mixture was heated to a temperature of 430° C. in a solid bed catalyst, by means of a salt bath. 95 grams/hr. (2.26 mols) propylene were added to the cycle gas (2.45 normal cubic meters); oxygen was added so as to produce a constant cycle gas composition of:

7.5% by volume propylene
6.3% by volume oxygen
7.8% by volume acrolein
20.0% by volume steam
29.0% by volume $CO_2$
27.5% by volume CO and
2.0% by volume balance gas ($H_2$, $C_2H_4$ and similar gases)

The sojurn time of the reaction gas in the reactor was about 0.85 second. The reaction gas, which contained about 1.2% by volume acrylic acid in vapor form, was subjected to the finishing treatment described in Example 3. Acrylic acid, which was in the form of a 25.6% aqueous solution, was obtained at a rate of 95.1 grams (1.32 mols) per hour. The acrylic acid yield was found to be 58.4%, referred to the propylene aded, or 61.9%, referred to the propylene transformed. The catalyst was found to have a productivity of 146 grams acrylic acid per liter per hour. In addition, there was obtained a 3% acetic acid yield plus a 3.4% formaldehyde yield. The activity of the catalyst could not be found to have been reduced after an operation period of 165 hours.

EXAMPLE 5

625 cc. of a catalyst composed of $$Ag_{0.24}Fe_{2.2}Bi_{0.6}Mo_{12}P_{0.2}O_{40.82}$$

was produced in the manner described in Example (1a) and compressed into pellets while adding 5% powdered graphite. After the catalyst had been formed, it was mixed with 625 cc. SiC and heated to a temperature of 425° C. inside a solid bed reactor 32.5 mm. wide. 116.4 grams (2.77 mols) propylene were added per hour to the cycle gas (2.4 normal cubic meters). Oxygen was added so as to produce a constant cycle gas composition of:

7.4% by volume propylene
7.7% by volume oxygen
6.3% by volume acrolein
20.0% by volume steam
30.1% by volume $CO_2$
27.5% by volume CO and
1.0% by volume balance gas ($H_2$, $C_2H_4$ and similar gases)

The reaction gas, which contained about 1.47% by volume acrylic acid in vapor form, was subjected to the finishing treatment described in Example 3. By extraction with 300 cc. water, there were obtained 113.4 grams/hr. acrylic acid in the form of a 22.2% aqueous solution containing 1.5% acetic acid and 1.4% aldehyde. The acrylic acid yield was found to be 56.8%, referred to the propylene added, or 60.7%, referred to the propylene transformed. The catalyst had a productivity of 181 grams acrylic acid per liter per hour.

The experiment was carried out over a period of 348 hours.

EXAMPLE 6

A catalyst having the composition $$Ag_{0.18}Fe_{7.0}Bi_{2.0}Mo_{12}P_{1.0}O_{52.09}$$

was produced in the manner described below.

444 grams $MoO_3$ were dissolved at 90° C. in 6.6 liters water with the addition of 29.7 grams phosphoric acid of 85% strength. The resulting molybdate solution was mixed later with 726 grams ($Fe(NO_3)_3 \cdot 9H_2O$), dissolved in 400 cc. water and 20 cc. concentrated nitric acid, 249 grams ($Bi(NO_3)_3 \cdot H_2O$), dissolved in 200 cc. water and 120 cc. concentrated nitric acid, and 8.2 grams $AgNO_3$, dissolved in 20 cc. water. The resulting suspension was evaporated to dryness. The catalytically active mass was treated further and pelletized with 4% powdered graphite, in the manner already described. On forming the catalyst, the graphite was found slowly to burn off.

Over 625 cc. of the formed catalyst mixed with 625 cc. SiC-particles, there were passed, at a bath temperature of 380° C., 3.3 normal cubic meters cycle gas composed of:

4.2% by volume propylene
6.5% by volume oxygen
7.0 % by volume acrolein
20.0% by volume steam
39.9% by volume $CO_2$
21.9% by volume CO and
0.9% by volume balance gas.

Cycle gas having the composition indicated above was produced by the addition per hour of 128 grams (3.04 mols) propylene and the corersponding variable proportions of oxygen. The reaction gas, which contained about 1.1% by volume acrylic acid in vapor form, was extracted with 375 cc./hr. water in the extraction column, which was operated at 63° C. There were obtained per hour 114 grams acrylic acid in the form of a 19.3% aqueous solution which contained 1.2% acetic acid and 1.9% formaldehyde. The acrylic acid yield was found to be 52.1%, referred to the propylene aded, or 53.5%, referred to the propylene transformed, for a catalyst productivity of 182 grams acrylic acid per liter per hour.

The experiment was conducted over a period of 176 hours.

We claim:

1. A catalyst consisting of the oxides of iron, bismuth, molybdenum and optionally phosphorus for use in the catalytic gas phase-oxidation of at least one member selected from the group consisting of propylene and acrolein by means of oxygen into acrylic acid, the catalyst containing silver oxide as an additional component in the atomic ratio of $$Ag_{0.01-1.5}Fe_{0.1-12}Bi_{0.1-12}P_{0-5}Mo_{12}O_{30-110}$$

2. The catalyst of claim 1 deposited on a carrier selected from the group consisting of silicon carbide, aluminum oxide and silicic acid ($SiO_2$).

3. The catalyst of claim 1 formed of particles with a size between 4 and 8 mm. and loosely mixed with SiC-particles having the same size.

References Cited

UNITED STATES PATENTS

| | | | |
|---|---|---|---|
| 2,229,199 | 1/1941 | Voorhies | 252—477X |
| 3,086,026 | 4/1963 | Wiebusch | 252—435X |
| 3,156,705 | 11/1964 | Kerr | 252—437X |
| 3,171,859 | 3/1965 | Sennewald et al. | 260—604 |
| 3,264,347 | 8/1966 | Sennewald et al. | 252—437X |
| 3,271,459 | 9/1966 | Brill et al. | 252—435 |
| 3,277,017 | 10/1966 | Stefaniak | 252—437 |
| 3,395,178 | 7/1968 | Callahan | 252—437X |

PATRICK P. GARVIN, Primary Examiner

U.S. Cl. X.R.

252—443, 456, 464, 470; 260—533, 604